July 16, 1968 G. A. SOBERSKI 3,392,750
CHECK VALVE ASSEMBLY
Filed Sept. 13, 1965
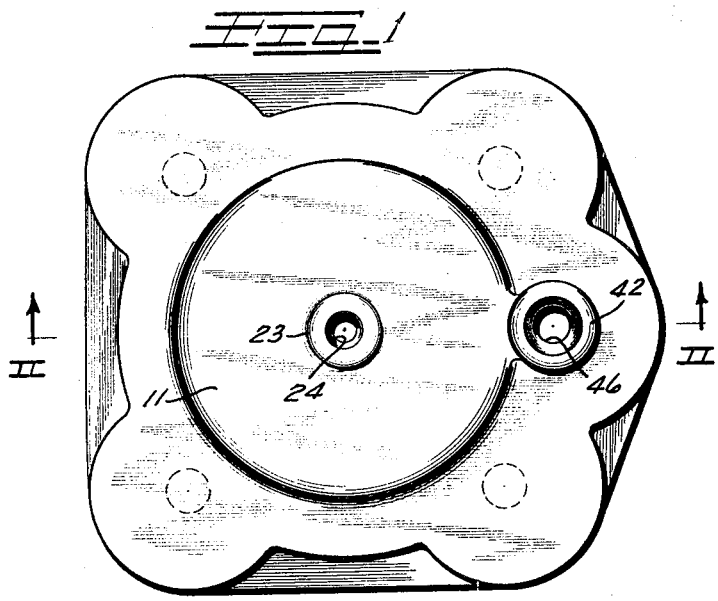
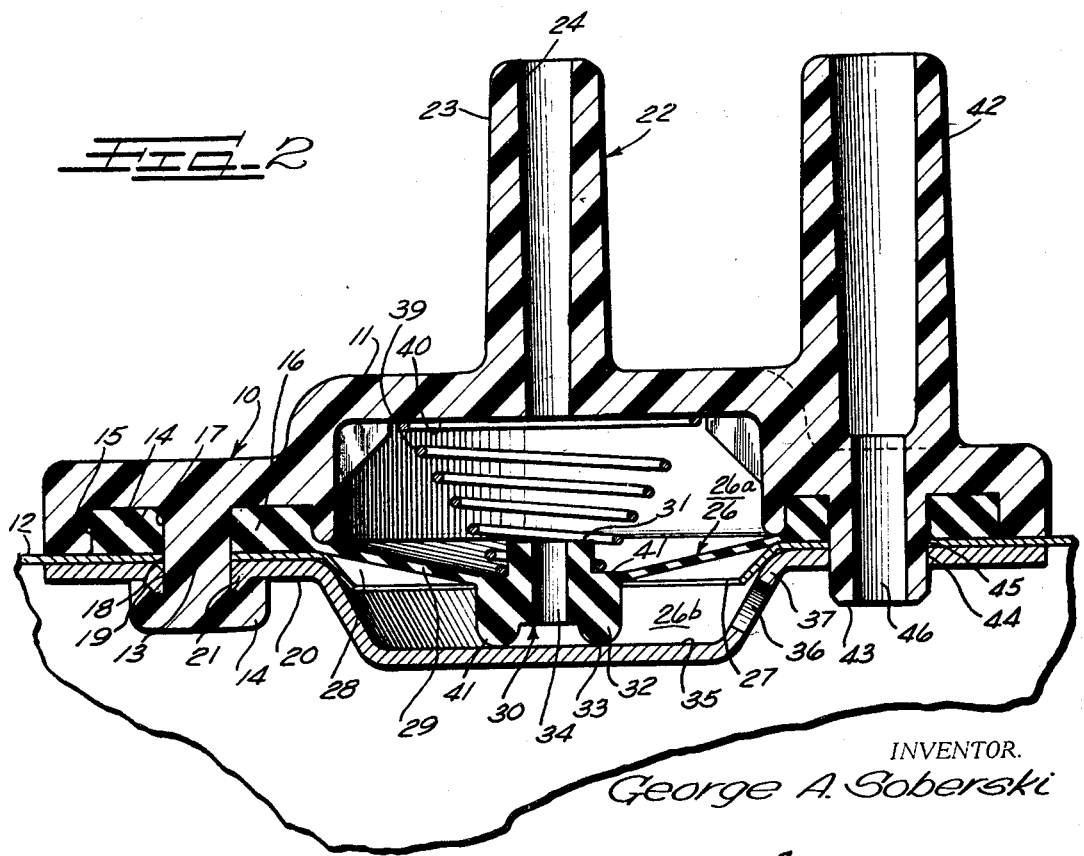
INVENTOR.
George A. Soberski
BY Hill, Sherman, Meroni, Gross & Simpson ATTORNEYS United States Patent Office 3,392,750
Patented July 16, 1968

3,392,750
CHECK VALVE ASSEMBLY
George A. Soberski, Des Plaines, Ill., assignor to The Dole Valve Company, Morton Grove, Ill., a corporation of Illinois
Filed Sept. 13, 1965, Ser. No. 486,977
15 Claims. (Cl. 137—496)

ABSTRACT OF THE DISCLOSURE

A check valve assembly for a vacuum storage tank having a valve housing disposed externally of the tank about the valve opening, a back-up plate disposed internally of the tank about the valve opening, a plurality of plastic rivets compressing the wall intermediate the valve housing and the back-up plate and providing a pressure seal thereby, the valve housing and the back-up plate defining a hollow region therebetween, an inlet formed within the valve housing for conducting from a vacuum supply to the hollow region and an outlet leading to the interior of the tank from the hollow region, and a valve within the hollow region for controlling the flow of vacuum to be unidirectional from the inlet to the outlet.

---

This invention relates to a check valve assembly having a novel valve head structure and a unique means of attachment to an associated storage tank. In particular, this invention relates to a check valve for use in conjunction with a vacuum storage tank as employed in an automobile vacuum operator system.

Recent developments in automobile vacuum delivery systems have made the utilization of the vacuum supply available at the intake manifold a more efficient tool for operating various automobile control devices. One such development has been in the use of a vacuum storage tank for the purpose of obtaining a more stable vacuum supply to the system operators.

In the absence of such a storage tank, the vacuum obtainable from the system fluctuates with engine speed in accordance with the vacuum supply at the engine manifold. The result is unfavorable system response.

The storage tank remedies this situation by providing a means for storing excess vacuum at low engine speeds and then delivering that vacuum to the system operators at high engine speeds. The result here is the uniformity not otherwise expected from an engine vacuum supply system.

However, if the storage tank system is to be useful in view of alternate power operator methods such as are available through electrical systems, means must be found for reducing the cost and improving the efficiency of associated control apparatus. One such associated apparatus is the storage tank check valve.

If vacuum developed within a storage tank at low speeds is to be available at high speeds, a check valve must be provided to prevent the loss of vacuum from the tank back to the manifold. This would occur when vacuum at the manifold fell below the vacuum available from the tank.

The manifold vacuum may fall due to climbing a steep grade or simply due to high engine speeds. To avoid loss of vacuum in such circumstances, the check valve closes the vacuum tank from the manifold supply and permits the higher tank vacuum to feed the system operators.

Accordingly, a principal object of this invention is to provide a check valve for use with a vacuum storage tank to permit the loss of vacuum from the tank to a fluctuating vacuum source.

It is another object of this invention to provide a check valve for use with a vacuum storage tank and which has a single diaphragm valve cooperable with a valve head for opening and closing respectively the vacuum supply from the vacuum storage tank.

It is also an object of this invention to provide a check valve assembly having a novel means of attaching the valve unit to the storage tank.

It is a further object of this invention to provide a check valve having a valve cavity formed by the valve housing and a back-up plate disposed at opposite sides of the storage tank walls.

It is an additional object of this invention to provide a check valve assembly constructed of a plastic-like material which can be readily assembled to the storage tank walls by reforming plastic fastener studs into suitable rivet heads.

These and other objects, features and advantages of the present invention will be understood in greater detail from the following description and the associated drawings wherein reference numerals are utilized in designating a preferred embodiment and wherein:

FIGURE 1 is a top view of the check valve assembly according to this invention, and FIGURE 2 is a sectional view of the valve assembly as taken along the lines II—II of FIGURE 1 showing the internal elements thereof and illustrating the attachment of the valve assembly to a storage tank wall.

A preferred embodiment of the check valve assembly of this invention is shown generally in FIGURE 2 as comprising a valve housing which is mounted at a storage tank wall through the provision for plastic studs which may be reformed into rivet heads and also through the use of a back-up plate which provides a means for compressing a resilient diaphragm between the housing and the tank wall. Essentially, an inlet conducts vacuum from the intake manifold to the interior of the check valve of this invention, and a valve outlet formed at the back-up plate makes this vacuum available to the storage tank.

The fundamental purpose of the check valve assembly is to assure that vacuum flow is unidirectional from the vacuum source to the storage tank. This means that the valve member must be operated for closing the vacuum source at all times when the source vacuum falls below the tank vacuum. Here, this is accomplished by the use of a resilient diaphragm which operates by vacuum differentials between oppositely disposed chambers. Fundamentally, the resilient diaphragm of this invention is a vacuum sensor which compares the vacuum at the intake manifold with that available within the storage tank and responds accordingly, always in a direction for either increasing the vacuum supply to the storage tank or preserving the supply available therein.

In FIGURE 2, the check valve assembly 10 is shown to have a valve body 11 mounted at the external surface of a storage tank 12 through a plurality of plastic studs 13. The studs 13 are provided to depend from an inner wall 14 of a groove or channel 15 formed about the periphery of the valve body 11.

In mounting the valve body to the vacuum storage tank, a valve seal is provided about the periphery of the valve body to assure that a vacuum tight chamber is established within the valve assembly. Here, the valve seal takes the form of a bead 16 which is also the support means for the resilient diaphragm of the system. The bead 16 conforms to the channel or groove 15 and extends throughout the periphery of the valve housing.

In assembly, the resilient bead 16 is fitted about the plastic stud 13 within the groove 15 at a plurality of openings 17 provided to conform tightly to the outside surface of the plastic studs. The plastic studs 13 are then received through fastener openings 18 and 19 formed within the rank wall 12 and a back-up plate 20. The back-up plate 20 is received over the stud 13 at the interior of the tank wall 12. To provide ease of assembly, the tank wall 12 itself may be a readily removable cover which can be threadedly mounted or the like to the storage tank unit.

As shown in FIGURE 2, the plastic stud 13 has a rivet-like head 14 formed at the outer end for securing the various components to the tank wall 12. To assure a tight junction at the periphery of the valve body, the resilient diaphragm bead 16 is provided to have a thickness which exceeds the like dimension of the groove 15, and the diaphragm bead can then be compressed against the tank wall by a pressure applied at the valve body 11. While holding the diaphragm bead in compression a hot iron is applied to the outer end of the plastic stud 13 for forming the rivet head 14. Upon cooling, a tight junction is provided between the respective members which are maintained in continuous tension due to the compression of the diaphragm bead 16.

It may be noted that the lower surface of the back-up plate 20 is provided with a raised lip 21 which is formed immediately adjacent to the fastener opening 19. The plastic stud 13 is then reformed in such a manner as to embed the lip 21 within the rivet head 14. The result is that any possible translation between the valve body 11 and the tank wall 12 is substantially eliminated. Such translation could otherwise exist if the tightness of the stud 13 within the fastener opening 19 were relied upon to prevent translation between the respective elements.

In referring to the internal operating elements of the check valve assembly of this invention, the valve body 11 is shown to have an inlet nipple 22 formed substantially centrally thereof and having an elongated external surface 23 for receiving a hose connection conducting from the engine intake manifold. An elongated passage 24 is formed axially of the nipple 22 and extends to the interior of the valve assembly.

The interior of the check valve assembly is comprised essentially of two chambers which are formed at both surfaces of a resilient diaphragm 26 which is an integral extension of the supporting bead and valve seal 16. The resilient diaphragm 26 extends across a valve opening 27 formed within the storage tank wall 12 and which is characterized by a sloped wall portion 28 to accommodate deflections of the diaphragm 26.

The resilient diaphragm 26, which is the principal valve operator of this assembly, consists of a web portion 29 and a resilient head 30 formed centrally thereof. The valve head 30 consists of a plane surface 31 formed at the valve body side of the diaphragm 26 and a rounded face 33 formed at the back-up plate side of the diaphragm. A control passageway 34 is formed centrally of the resilient boss 30 and is provided to be substantially axially orientated relative to the inlet passageway 24.

As shown in FIGURE 2, the seating of the valve head 30 at the inner surface 35 of the back-up plate 20 allows the inlet passageway 24 to be directly communicable with the first actuation chamber 26a. However, the seating of the valve head 30 simultaneously obstructs a direct connection between the vacuum source as supplied through the inlet passageway 24 and the second actuation chamber 26b. This positioning of the valve head 30, then, corresponds to a closed setting of the check valve, insofar as the only means of communication with the vacuum source is provided through a port 36 formed within a sloped wall portion 37 of the back-up plate 20.

Although the positioning of the resilient head 30 as indicated in FIGURE 2 corresponds to a closed setting of the check valve, an unseating of the head 30 will result in an open setting of the check valve, insofar as there will be provided a direct means of communication between the vacuum source associated with the inlet passageway 24 and the interior of tht storage tank. This direct communication exists through the passageway 24 and the aligned control passageway 34 to the vicinity of the second actuator chamber 26b, and, hence, to the interior of the storage tank through the port 36.

From this consideration of the effects of the alternate positioning of the resilient head 30, it can be understood that a force must be provided for holding the resilient head 30 off the back-up plate 20 at times when the source vacuum exceeds the vacuum available at the storage tank. Likewise, it is understood that an opposing force must be provided for securing the resilient head 30 into a seated position at the inner surface 35 of the back-up plate 20 at times when the vacuum available at the storage tank should exceed the vacuum of the source manifold due to a decrease in engine speed.

In further considering the effect of changes in vacuum either at the vacuum storage tank or at the source manifold, it will be understood that the force naturally resulting at the diaphragm surface will be correctly orientated for performing the desirable check valve function. Essentially, at times when the tank vacuum is low due to the vacuum consumption at a system operator, the resilient diaphragm 26 would experience a higher vacuum within the area of the chamber 26a than experienced within the chamber 26b resulting in a net force at the diaphragm surface for holding the plane valve head 32 off the back-up plate 20. Therefore, the source vacuum will be available continuously to replenish the vacuum supply of the storage tank. However, should the vacuum at the engine manifold suddenly decline due, for instance, to increased engine speeds, means must be provided to prevent the higher vacuum within the storage chamber from being lost to the manifold regions. Such means are provided, as in the previous example, for holding the resilient head 30 into a closed position with the inner surface 35 of the back-up plate 20. This will occur because a higher vacuum at the storage tank interior will be similarly experienced within the directly communicable chamber 26b for forcing the diaphragm 26 and hence the rounded face 33 of the valve head 32 into engagement with the back-up plate 20. The valve head 30 will then remain in a closed position at the back-up plate 20 until such time as the vacuum experienced within the upper chamber 26a exceeds the vacuum available at the lower chamber 26b.

In addition to the principal operation motions of the diaphragm 26 necessary to perform the check valve function, it has been found that by the use of a return spring 39 an improved operation can be achieved. In particular, it has been discovered that the return spring 39 which is disposed between the inner surface 40 of the valve body 11 and a shoulder 41 formed about the plane surface 31 of the resilient boss 30 provides a uniformity of function and assures consistent shut-off. The biasing of the resilient head 30 into engagement with the back-up plate 20 assures that shut-off is accomplished before vacuum is permitted to escape from the storage tank through the inlet 24 back to the intake manifold. For instance, during normal operation of the system operators, the vacuum at the intake manifold will considerably exceed the vacuum of the storage chamber. However, as the vacuum begins to fall at the intake manifold the presence of the biasing spring 39 anticipates a further decline and closes the storage tank from the inlet passageway before the vacuum source can reach a vacuum level comparable to the vacuum available at the storage tank. In the absence of a biasing spring, the vacuum at the source would fall approximately to the tank vacuum before the resilient head would be drawn into engagement with the back-up plate. The existence of the biasing spring 39, however, guarantees that the vacuum source will continuously exceed the vacuum of the storage tank at times when the valve head 30 is off the back-up plate 20.

In addition to the check valve functioning of the resilient diaphragm 26, this valve assembly also provides an outlet nipple 42 formed integrally with the valve body 11 and provided with a sleeve portion 43 extending through openings 44 and 45 formed within the back-up plate and tank wall respectively. An outlet passageway 46 extends through the sleeve 43 and the nipple 42 for communicating the interior of the vacuum storage tank with a vacuum operator or a control mechanism which may be connected to the nipple 42 by a vacuum hose or the like. Also, as in the case of the connection provided for the fastener stud 13, the diaphragm bead 16 is compressed about the sleeve 43 to provide a vacuum seal for the interior of the check valve assembly.

It will be understood that various modifications may be suggested by the embodiment disclosed, but I desire to claim within the scope of the patent warranted hereon all such modifications as come within the scope of my invention.

I claim as my invention:

1. In a vacuum storage tank having a valve opening formed within a wall thereof, a check valve assembly comprising:
   a valve housing disposed externally of said tank about said valve opening,
   a back-up plate disposed internally of said tank about said valve opening,
   fastening means compressing said wall intermediate said valve housing and said back-up plate and providing a pressure seal thereby,
      said valve housing and said back-up plate defining a hollow region therebetween,
   an inlet formed within said valve housing for conducting from a vacuum supply to said hollow region and an outlet leading to the interior of said tank from said hollow region,
   valve means within said hollow region for controlling the flow of vacuum to be unidirectional from said inlet to said outlet.

2. In a vacuum storage tank having a valve opening formed within a wall thereof, a check valve assembly comprising:
   a valve housing disposed externally of said tank about said valve opening,
   a back-up plate disposed internally of said tank about said valve opening,
   a resilient diaphragm extending across said valve opening and having a bead thereof disposed between said valve housing and said wall,
   fastening means compressing said resilient diaphragm and said wall intermediate said valve housing and said back-up plate for providing a pressure seal thereby,
      said valve housing and said back-up plate defining a hollow region therebetween,
   an inlet formed within said valve housing for conducting from a vacuum supply to said hollow region and an outlet leading to the interior of said tank from said hollow region,
   valve means within said hollow region cooperable with said resilient diaphragm for controlling the flow of vacuum to be substantially unidirectional from said inlet to said outlet.

3. In a vacuum storage tank having a valve opening formed within a wall thereof, a check valve assembly comprising:
   a valve housing disposed externally of said tank about said valve opening,
   a back-up plate disposed internally of said tank about said valve opening,
   a resilient diaphragm extending across said valve opening and having a bead thereof disposed between said valve housing and said wall,
   a fastening means compressing said resilient diaphragm and said wall intermediate said valve housing and said back-up plate for providing a pressure seal thereby,
      said valve housing and said back-up plate defining a hollow region therebetween,
   an inlet formed within said valve housing for conducting from a vacuum supply to said hollow region and an outlet leading to the interior of said tank from said hollow region,
   valve means within said hollow region cooperable with said resilient diaphragm for controlling the flow of vacuum to be substantially unidirectional from said inlet to said outlet,
   resilient means within said valve housing biasing said valve means into a closed position.

4. In a vacuum storage tank having a valve opening formed within a wall thereof, a check valve assembly comprising:
   a valve housing disposed externally of said tank about said valve opening,
   a back-up plate disposed internally of said tank about said valve opening,
   a resilient diaphragm extending across said valve opening and having a bead thereof disposed between said valve housing and said wall,
   fastening means compressing said resilient diaphragm and said wall intermediate said valve housing and said back-up plate for providing a pressure seal thereby,
      said valve housing and said back-up plate defining a hollow region therebetween and said resilient diaphragm dividing said hollow region into first and second chambers,
   an inlet formed within said valve housing for conducting from a vacuum supply to said first chamber and an outlet leading to the interior of said tank from said second chamber,
   valve means within said hollow region cooperable with said resilient diaphragm for controlling the flow of vacuum to be substantially unidirectional from said inlet to said outlet.

5. In a vacuum storage tank having a valve opening formed within a wall thereof, a check valve assembly comprising:
   a valve housing disposed externally of said tank about said valve opening,
   a back-up plate disposed internally of said tank about said valve opening,
   a resilient diaphragm extending across said valve opening and having a bead thereof disposed between said valve housing and said wall,
   fastening means compressing said resilient diaphragm and said wall intermediate said valve housing and said back-up plate for providing a pressure seal thereby,
      said valve housing and said back-up plate defining a hollow region therebetween and said resilient diaphragm dividing said hollow region into first and second chambers,
   an inlet formed within said valve housing for conducting from a vacuum supply to said first chamber and an outlet leading to the interior of said tank from said second chamber,
   a valve seat formed within said valve housing intermediate said inlet and said outlet,
      said resilient diaphragm having a valve head formed integrally therewith and being cooperable with said valve seat for controlling the flow of vacuum to be unidirectional from said inlet to said outlet.

6. In a vacuum storage tank having a valve opening formed within a wall thereof, a check valve assembly comprising:
   a valve housing disposed externally of said tank about said valve opening,
   a back-up plate disposed internally of said tank about said valve opening,
   a resilient diaphragm extending across said valve opening and having a bead thereof disposed between said valve housing and said wall, fastening means compressing said resilient diaphragm and said wall intermediate said valve housing and said back-up plate for providing a pressure seal thereby, said valve housing and said back-up plate defining a hollow region therebetween and said resilient diaphragm dividing said hollow region into first and second chambers, an inlet formed within said valve housing for conducting from a vacuum supply to said first chamber and an outlet leading to the interior of said tank from said second chamber, a valve seat formed within said second chamber, a valve head formed integrally with said resilient diaphragm and being cooperable with said valve seat for controlling the flow of vacuum to be unidirectional from said inlet to said outlet, resilient means biasing said valve head into engagement with said back-up plate.

7. In a vacuum storage tank having a valve opening formed within a wall thereof, a check valve assembly comprising:

a valve housing disposed externally of said tank about said valve opening, a back-up plate disposed internally of said tank about said valve opening, a resilient diaphragm extending across said valve opening and having a bead thereof disposed between said valve housing and said wall, fastening means compressing said resilient diaphragm and said wall intermediate said valve housing and said back-up plate for providing a pressure seal thereby, said valve housing and said back-up plate defining a hollow region therebetween and said resilient diaphragm dividing said hollow region into first and second chambers, an inlet formed within said valve housing for conducting from a vacuum supply to said first chamber and an outlet leading to the interior of said tank from said second chamber, a valve seat formed within said second chamber, a resilient boss formed integrally with said diaphragm and having a control passageway formed therein for being substantially axially aligned with said inlet, said resilient boss having a valve head formed thereon for being cooperable with said valve seat to open and close said inlet relative to said control passageway and said outlet, said resilient diaphragm and said integrally formed boss being freely movable within said valve opening for engaging and disengaging said valve seat in response to a pressure differential between said vacuum source and said storage tank.

8. In a vacuum storage tank having a valve opening formed within a wall thereof, a check valve assembly comprising:

a valve housing disposed externally of said tank about said valve opening, a back-up plate disposed internally of said tank about said valve opening, a resilient diaphragm extending across said valve opening and having a bead thereof disposed between said valve housing and said wall, fastening means compressing said resilient diaphragm and said wall intermediate said valve housing and said back-up plate for providing a pressure seal thereby, said valve housing and said back-up plate defining a hollow region therebetween and said resilient diaphragm dividing said hollow region into first and second chambers, an inlet formed within said valve housing for conducting from a vacuum supply to said first chamber and an outlet leading to the interior of said tank from said second chamber, a valve seat formed within said second chamber, a resilient boss formed integrally with said diaphragm and having a control passageway formed therein for being substantially axially aligned with said inlet, said resilient boss having a valve head formed thereon for being cooperable with said valve seat to open and close said inlet relative to said control passageway and said outlet, said valve head having a raised collar portion formed about said control passageway and having a rounded face thereon for engaging said valve seat.

9. In a vacuum storage tank having a valve opening formed within a wall thereof, a check valve assembly comprising:

a valve housing disposed externally of said tank about said valve opening, a back-up plate disposed internally of said tank about said valve opening, said valve housing having a stud fastener extending from an inner wall thereof, a fastener opening formed within said back-up plate for receiving said stud fastener therethrough, means utilizing said fastener stud for compressing said wall intermediate said valve housing and said back-up plate, said valve housing and said back-up plate defining a hollow region therebetween, an inlet formed within said valve housing for conducting from a vacuum supply to said hollow region and an outlet leading to the interior of said tank from said hollow region, valve means within said hollow region for controlling the flow of vacuum to be unidirectional from said inlet to said outlet.

10. A check valve as described in claim 9 wherein said valve housing is constructed of a plastic-like material for allowing said stud fasteners to be readily reformed by the application of heat thereto.

11. In a vacuum storage tank having a valve opening formed within a wall thereof, a check valve assembly comprising:

a valve housing disposed externally of said tank about said valve opening, a back-up plate disposed internally of said tank about said valve opening, said valve housing having a stud fastener extending from an inner wall thereof, a fastener opening formed within said back-up plate for receiving said stud fastener therethrough, said stud fastener being formed into a rivet head for compressing said wall between said valve housing and said back-up plate, said valve housing and said back-up plate defining a hollow region therebetween, an inlet formed within said valve housing for conducting from a vacuum supply to said hollow region and an outlet leading to the interior of said tank from said hollow region, valve means within said hollow region for controlling the flow of vacuum to be unidirectional from said inlet to said outlet.

12. A check valve for controlling the flow of vacuum to a vacuum storage tank comprising:

a valve housing disposed at the outer surface of a wall of said vacuum tank, a resilient valve seal disposed intermediate said housing and said outer surface of said wall of said vacuum tank, a back-up plate disposed at the inner surface of said wall of said vacuum tank, a stud fastener extending from an inner wall of said valve housing, a fastener opening formed within said back-up plate for receiving said stud fastener therethrough, said stud fastener being formed into a rivet head for compressing said resilient valve seal and said wall of said vacuum tank between said back-up plate and said valve housing, inlet means for connecting a vacuum source to the interior of said vacuum storage tank, outlet means for connecting the interior of said vacuum storage tank to a control operator for performing a work function, valve means disposed within said valve housing for preventing the loss of vacuum from said storage tank through said inlet means.

13. A check valve for controlling the flow of vacuum to a vacuum storage tank comprising:

a valve housing disposed at the outer surface of a wall of said vacuum tank and having a mounting flange extending radially therefrom, a resilient diaphragm extending across the interior of said valve housing and having a bead thereof disposed intermediate said flange and said wall of said vacuum tank, a back-up plate disposed at the inner surface of said wall of said vacuum tank, a stud fastener extending from an inner wall of said valve housing, a fastener opening formed within said back-up plate for receiving said stud fastener therethrough, said stud fastener being formed into a rivet head for compressing said resilient diaphragm and said wall of said vacuum tank between said back-up plate and said valve housing, inlet means for connecting a vacuum source to the interior of said vacuum storage tank, outlet means for connecting the interior of said vacuum storage tank to a control operator for performing a work function, said resilient diaphragm disposed within said valve housing for preventing the loss of vacuum from said storage tank through said inlet means.

14. In a vacuum storage tank having a valve opening formed within a wall thereof, a check valve comprising:

a valve housing disposed at the outer surface of said wall and having a mounting flange extending radially of said valve opening, a resilient diaphragm extending across the interior of said valve housing and having a bead thereof disposed intermediate said flange and said wall of said vacuum tank, a back-up plate disposed at the inner surface of said wall of said vacuum tank, a stud fastener extending from an inner wall of said valve housing, a fastener opening formed within said back-up plate for receiving said stud fastener therethrough, said stud fastener being formed into a rivet head for compressing said resilient diaphragm and said wall of said vacuum tank between said back-up plate and said valve housing, a hollow region formed within said valve housing and defining an actuation chamber intermediate said valve housing and said resilient diaphragm, said valve housing having an inlet formed therein for conducting from a vacuum supply to said actuation chamber, an outlet formed within said actuation chamber, said resilient diaphragm cooperable with said outlet for restricting the flow of vacuum to be substantially unidirectional from said inlet to the interior of said tank.

15. In a vacuum storage tank having a valve opening formed within a wall thereof, a check valve comprising:

a valve housing disposed at the outer surface of said wall and having a mounting flange extending radially of said valve opening, a resilient diaphragm extending across the interior of said valve housing and having a bead thereof disposed intermediate said flange and said wall of said vacuum tank, a back-up plate disposed at the inner surface of said wall of said vacuum tank, a stud fastener extending from an inner wall of said valve housing, a fastener opening formed within said back-up plate for receiving said stud fastener therethrough, said stud fastener being formed into a rivet head for compressing said resilient diaphragm and said wall of said vacuum tank between said back-up plate and said valve housing, a first hollow region formed within said valve housing and defining a first actuation chamber intermediate said valve housing and said resilient diaphragm, a second hollow region formed within said back-up plate and defining a second actuation chamber intermediate said back-up plate and said resilient diaphragm, said resilient diaphragm providing a common wall between said first and second actuation chambers and being freely movable within said valve opening, said valve housing having an inlet formed therein for conducting from a vacuum supply to said first actuation chamber, a port formed within said back-up plate for communicating said second actuation chamber with the interior of said tank, said resilient diaphragm cooperable with said port and said back-up plate for restricting the flow of vacuum to be substantially unidirectional from said inlet through said port to the interior of said tank.

References Cited

UNITED STATES PATENTS

| | | | |
|---|---|---|---|
| 2,121,549 | 6/1938 | McNeal | 137—496 |
| 2,462,189 | 2/1949 | Hess | 137—496 |
| 2,722,455 | 11/1955 | Oishei | 137—495 XR |
| 3,297,260 | 1/1967 | Barlow | 137—496 XR |

FOREIGN PATENTS 487,908  6/1938  Great Britain.

M. CARY NELSON, *Primary Examiner.*

R. J. MILLER, *Assistant Examiner.*